United States Patent
Acker et al.

(10) Patent No.: US 8,939,464 B2
(45) Date of Patent: Jan. 27, 2015

(54) SEAT BACK OF A VEHICLE SEAT AND VEHICLE SEAT HAVING SUCH SEAT BACK

(75) Inventors: Dominique Acker, Gschwend (DE); Andreas Loos, Rechberghausen (DE); Torsten Sassmannshausen, Lorch (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/279,516

(22) Filed: Oct. 24, 2011

(65) Prior Publication Data

US 2013/0009431 A1 Jan. 10, 2013

(30) Foreign Application Priority Data

Nov. 16, 2010 (DE) .......................... 10 2010 051 521

(51) Int. Cl.
| | | |
|---|---|---|
| B60R 21/207 | (2006.01) | |
| B60R 21/237 | (2006.01) | |
| B60R 21/16 | (2006.01) | |
| B60N 2/58 | (2006.01) | |

(52) U.S. Cl.
CPC ............. B60R 21/207 (2013.01); B60R 21/237 (2013.01); *B60R 2021/161* (2013.01); *B60N 2002/5808* (2013.01)
USPC ..................................... 280/730.2; 280/728.3

(58) Field of Classification Search
USPC ............. 280/728.2, 730.2; 297/216.1, 216.13
See application file for complete search history.

(56) References Cited

U.S. PATENT DOCUMENTS

| 5,997,032 A | * | 12/1999 | Miwa et al. ................. 280/730.2 |
| 6,206,466 B1 | * | 3/2001 | Komatsu ................... 297/216.13 |
| 7,178,826 B2 | * | 2/2007 | Acker et al. ............... 280/730.2 |
| 7,562,902 B2 | * | 7/2009 | Osterhout .................. 280/730.2 |
| 2002/0130537 A1 | * | 9/2002 | Lotspih ..................... 297/216.13 |
| 2005/0006933 A1 | * | 1/2005 | Bargheer et al. ......... 297/216.13 |
| 2007/0057493 A1 | * | 3/2007 | Ritzel et al. ............... 280/730.2 |
| 2007/0284859 A1 | * | 12/2007 | Kashiwagi ................ 280/730.2 |
| 2007/0290488 A1 | * | 12/2007 | Taguchi et al. ............ 280/730.2 |
| 2008/0100043 A1 | * | 5/2008 | Sundmark et al. ......... 280/730.2 |
| 2008/0296941 A1 | * | 12/2008 | Bederka et al. ............ 297/216.1 |
| 2010/0244414 A1 | * | 9/2010 | Gilbert et al. .............. 280/730.1 |

FOREIGN PATENT DOCUMENTS

DE 102009014107 A1 * 9/2010
DE 102009016885 A * 10/2010

* cited by examiner

*Primary Examiner* — Ruth Ilan
(74) *Attorney, Agent, or Firm* — Tarolli, Sundheim, Covell & Tummino LLP

(57) ABSTRACT

A seat back has a rigid seat back frame and a cover. A seat back center part extends substantially perpendicular to the sitting direction. Two seat back frame sides laterally delimit the seat back and are transformed into the seat back center part. An airbag module accommodated in the cover of one of the seat back frame sides is mounted to the seat back frame. In the area of the seat back frame side, the seat back frame has a contact surface adjacent to a spirally folded airbag and extending substantially obliquely forward away from the seat back center part. The contact surface includes an angle ($\alpha$) of $10° \leq \alpha \leq 45°$ with the sitting direction. The airbag extends substantially obliquely forward away from the center part and is wound spirally inwardly in a sense of rotation directed away from the center part.

14 Claims, 2 Drawing Sheets

SEAT BACK OF A VEHICLE SEAT AND VEHICLE SEAT HAVING SUCH SEAT BACK

FIELD OF THE INVENTION

The invention relates to a seat back of a vehicle seat having a substantially rigid seat back frame and a cover surrounding the seat back frame, comprising a full-surface seat back center part extending substantially perpendicularly to the sitting direction in the transverse direction of the seat back, two seat back frame sides opposed in the transverse direction of the seat back which laterally delimit the seat back and are transformed into the seat back center part as well as an airbag module accommodated in the cover of one of the seat back frame sides and mounted to the seat back frame, which airbag module includes an inflator and a spirally folded airbag. The invention further relates to a vehicle seat having such seat back and a vehicle including such vehicle seat.

BACKGROUND OF THE INVENTION

For protecting a vehicle occupant laterally against a hard impact, vehicle seats in the seat back of which an airbag module is integrated are known from the state of the art. Said airbag modules are arranged either on an inside facing the occupant or on an outside facing away from the occupant of the largely rigid seat back frame in the area of a seat back frame side, wherein in this area the seat back frame extends substantially in the sitting direction (of the occupant), as visible in FIG. 1.

In an airbag module mounted to the frame inside there is a lower risk of pinching the airbag by the penetrating vehicle side structure, i.e. the airbag has more time to deploy between the occupant and the vehicle side structure. However, with such arrangement it has to be taken into consideration that the deploying airbag is not directed too strongly toward the occupant and, above all, does not excessively load the occupant during deployment even when his sitting position is shifted sideward. If, on the other hand, the airbag module is mounted to the outside of the frame, the airbag deploys away from the occupant and initially has a quite large distance from the vehicle occupant. This results in a rather late contact with the occupant. Depending on the distance between the mounted airbag module and the intruding vehicle side structure, the period of time for unhindered deployment of the airbag is very short.

EP 1 581 413 B1 shows a vehicle seat having a generic seat back, the airbag module being attached to an inside, i.e. a side of the seat back frame facing the vehicle occupant in the area of the seat back frame side. The seat back frame extends in the area of the seat back frame side in the sitting direction and is formed by a double T-beam having a high web and narrow flanges. Adjacent to the inflator, the airbag is folded at first in a multiple concertina-like manner and then in spiral shape.

It is the object of the invention to provide a seat back with an integrated airbag module, wherein even in non-ideal sitting positions of the vehicle occupant the airbag shows a deployment behavior that affects the occupant convenience as little as possible.

SUMMARY OF THE INVENTION

In accordance with the invention, this object is achieved by a seat back of the type mentioned in the beginning in which in the area of the seat back frame side the seat back frame has a contact surface adjacent to the spirally folded airbag and extending substantially obliquely forward away from the seat back center part related to the sitting direction so that the contact surface includes an angle of $10° \leq \alpha \leq 45°$ with the sitting direction, wherein starting from the inflator and related to the sitting direction the airbag substantially extends obliquely forward away from the seat back center part and is wound spirally inwardly in a sense of rotation away from the seat back center part.

The invention is based on the finding that a desired occupant protection and occupant convenience is brought about by combining a spiral-shaped airbag folding directed away from the vehicle occupant with an obliquely forward directed main deployment direction of the airbag predetermined by the contact surface. The seat back has a longitudinal seat back direction extending from the occupant's bottom to the occupant's head at the usual sitting position and a transverse seat back direction extending from one shoulder to the other shoulder of the occupant at the usual sitting position. The direction which is perpendicular to the plane spanned by the transverse seat back direction and the longitudinal seat back direction and is directed in the direction of a potential occupant is then referred to as sitting direction.

An angle of $10° \leq \alpha \leq 45°$, preferably of $15° \leq \alpha \leq 35°$ and especially preferred of $\alpha \approx 20°$ has turned out to be a suited angle between the contact surface of the seat back frame and the sitting direction. This angle significantly influences the main deployment direction of the airbag. This applies in particular to embodiments having a substantially plane contact surface. In connection with a spiral-shaped folding of the airbag directed away from the seat back center part a deployment behavior is resulting in which the airbag does not excessively load the occupant, even if the latter is not ideally positioned, but at the same time deploys very closely to the occupant. It is preferred that the airbag in its extension from the inflator to its free end is folded spirally over the substantial part of its length. Between the inflator and the spirally folded part a maximum of two concertina-like folded airbag portions are to be provided. At the free end of the airbag facing away from the inflator at most one concertina-like folded airbag portion is to be provided. This means in this context that a concertina-like folded airbag portion consists of two superimposed airbag layers and consequently in two concertina-like folded airbag portions four airbag layers are superimposed. It is especially preferred that the entire airbag is spirally rolled and has no concertina-like folded airbag portions.

In an embodiment of the seat back the airbag module is arranged in the seat back frame side on a side of the seat back frame facing the seat back center part. This contributes significantly to the fact that the airbag deploys very closely to the occupant in a desired manner.

Preferably the airbag module extends substantially in parallel to the contact surface of the seat back frame. Before actuation of the airbag module the airbag module extends in a plane which is spanned by an inflator axis of the inflator and a spiral axis of the spirally folded airbag.

The invention further comprises a vehicle seat having an afore-described seat back, wherein preferably an airbag accommodated in a left-hand frame side related to the sitting direction is wound anti-clockwise spirally inwardly viewed from above and an airbag accommodated in a right-hand frame side related to the sitting direction is wound clockwise spirally inwardly viewed from above. These winding directions ensure that the airbag deploys optimally in the direction of the occupant, i.e. adapts to the occupant while unrolling from outside.

Finally the invention also relates to a vehicle comprising a vehicle seat that has an afore-described seat back, wherein an airbag module is provided only in the seat back frame side which is closest to a vehicle side panel when the vehicle seat is installed. This allows for the fact that a side of the occupant facing the vehicle side panel is definitely more endangered than a side of the occupant facing the vehicle center. Therefore, under the aspect of occupant safety, it is sufficient in several vehicle designs to provide an airbag module merely at the side of the seat back adjacent to the vehicle side panel.

DESCRIPTION OF THE EXAMPLE EMBODIMENT

Figure 1:
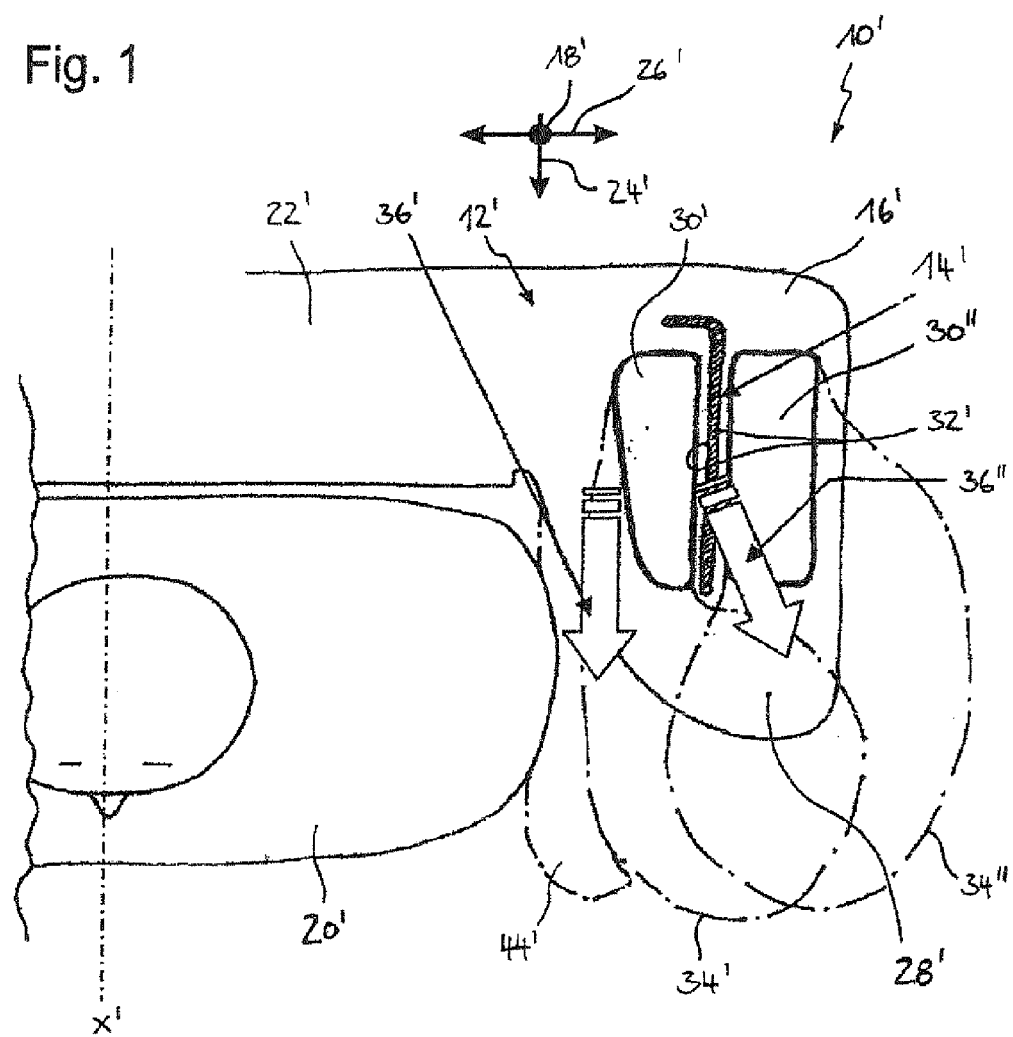
FIG. 1 shows a schematic partial section across a seat back according to the state of the art.

FIG. 1 illustrates a known vehicle seat 10' comprising a conventional seat back 12' having a substantially rigid seat back frame 14' and a cover 16' surrounding the seat back frame 14'. The seat back frame 14' usually comprises several fixedly interconnected profile parts of sheet metal forming the structural framework of the seat back 12'. By the cover 16' of the seat back frame 14', for instance, a shell of fabric or leather as well as a cushion usually provided between the shell and the seat back frame 14' is understood.

In FIG. 1 a sheet profile of the seat back frame 14' L-shaped in cross-section is exemplified which extends in the longitudinal seat back direction 18'. If an occupant 20' adopts the usual sitting posture in the vehicle seat 10', the longitudinal seat back direction 18' corresponds to a direction from the bottom to the head of the occupant 20'.

The seat back 12' comprises a full-surface seat back center part 22' extending substantially perpendicularly to a sitting direction 24' in the transverse seat back direction 26', two seat back frame sides 28' opposed in the transverse seat back direction 26' which laterally delimit the seat back 12' and are transformed into the seat back center part 22' as well as an airbag module 30', 30" accommodated in the cover 16' of one of the seat back frame sides 28' and mounted to the seat back frame 14'. As the vehicle seat 10', 10 is constructed substantially symmetrically with respect to an axis X' X, the sectional view in the Figures is restricted to no more than approximately one half of the vehicle seat 10', 10 so that especially only one of the seat back frame sides 28', 28 is visible.

In the area of the seat back frame side 28' the seat back frame 14' forms a contact surface 32' adjacent to the airbag module 30', 30 and extending substantially in the sitting direction 24'. With an occupant 20' adopting the usual sitting position in the vehicle seat 10' a direction is referred to as sitting direction 24' which extends perpendicularly to the plane spanned by the longitudinal seat back direction 18' and the transverse seat back direction 26' toward the occupant 20'.

The seat back 12' according to the state of the art shown in FIG. 1 illustrates two alternative mounting positions for the airbag module 30', 30". In a first mounting variant the airbag module 30' is arranged on a side of the seat back frame 14' facing the seat back center part 22' and the occupant 20', resp., in the seat back frame side 28'. The position of the cover 16' and of a deployed airbag 34' after actuation of the airbag module 30' is indicated by a dash-dotted line. Moreover, a main deployment direction of the airbag 34' is shown by an arrow 36' extending substantially in the sitting direction 24'. If the sitting position of the occupant 20' is not ideal, this may affect the occupant's convenience.

In a second mounting variant, the airbag module 30" is arranged on a side of the seat back frame 14' facing away from the seat back center part 22' and the occupant 20', resp., in the seat back frame side 28'. The outline of the deployed airbag 34" after actuating the airbag module 30" is again indicated by a dash-dotted line and the main deployment direction is indicated by an arrow 36". It becomes clear that a quite large distance is provided between the airbag 34" and the occupant 20'. Such distance of the occupant 20' from the airbag 34" is usually not desired, because in the case of impact the vehicle occupant 20' is first exposed to considerable accelerations before he is finally slowed down again by the airbag 34".

Figure 2:
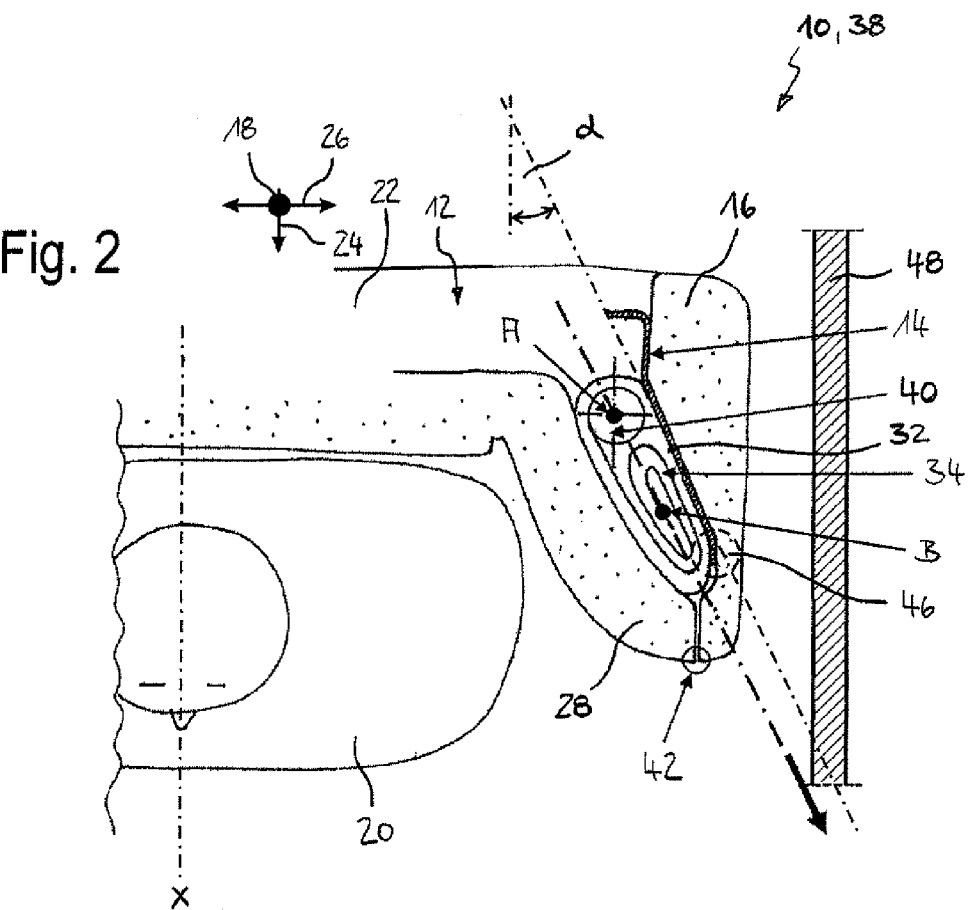
FIG. 2 shows a schematic partial section across a seat back according to the invention of a vehicle seat according to the invention prior to actuating the airbag module.
Figure 3:
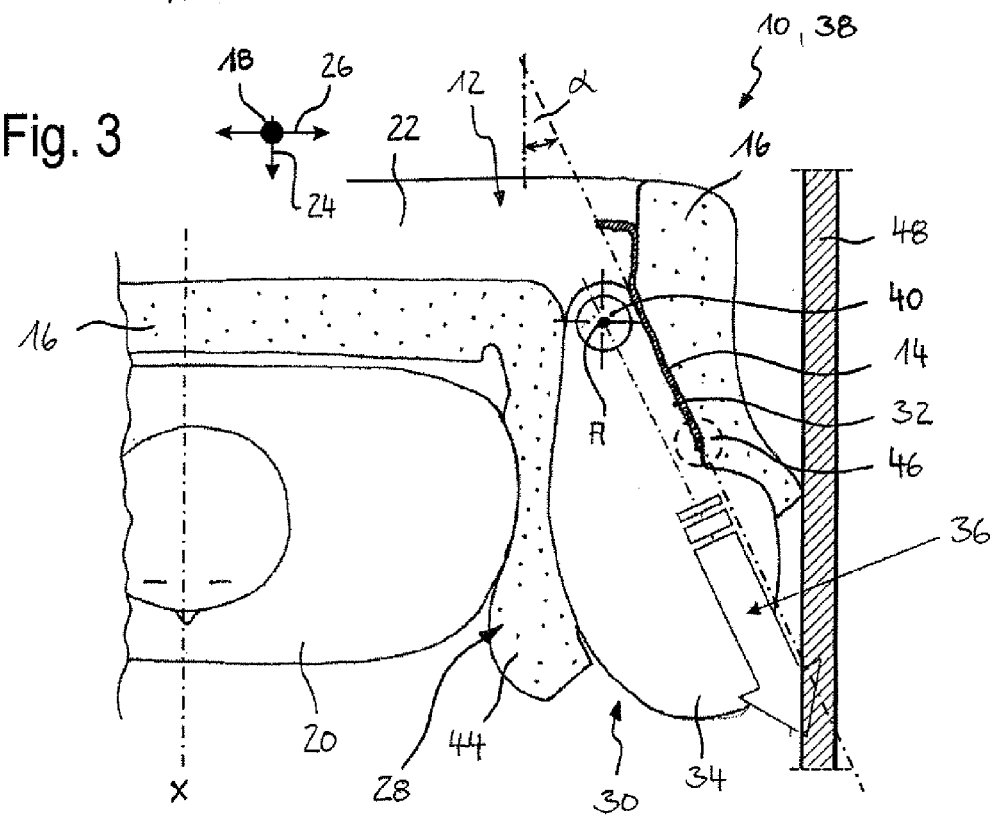
FIG. 3 shows a schematic partial section across a seat back according to FIG. 2 after actuating the airbag module.

The FIGS. 2 and 3 show a vehicle 38 according to the invention including a vehicle seat 10 according to the invention which comprises a seat back 12 according to the invention.

The basic structure of the vehicle seat 10 and the seat back 12 according to FIGS. 2 and 3 largely corresponds to the embodiment according to FIG. 1, which is why explicit reference shall be made to the foregoing description and merely differences shall be discussed. Corresponding components have the same reference numbers, the reference numbers for components of the state of the art being additionally marked by a prime or double prime.

FIG. 2 shows a partial section of the seat back 12 and a top view of the occupant 20 before actuation of the airbag module 30.

The airbag module 30 comprises an inflator 40 and a spirally folded airbag 34 which extends substantially obliquely forward away from the seat back center part 22 starting from the inflator 40 and related to the sitting direction 24 and is wound spirally inwardly in a sense of rotation directed away from the seat back center part 22.

The contact surface 32 of the seat back frame 14 in the area of the seat back frame side 28 is adjacent to the spirally folded airbag 34 and extends substantially obliquely forward away from the seat back center part 22 so that the contact surface 32 includes an angle $\alpha$ of $10°\leq\alpha\leq45°$, preferably of $15°\leq\alpha\leq35°$ and especially preferred an angle $\alpha\approx20°$, with the sitting direction 24.

In the shown embodiment the airbag module 30 is arranged on a side of the seat back frame 14 facing the seat back center part 22 and the occupant 20, resp., in the seat back frame side 28.

In accordance with FIG. 2, the airbag 34 is folded exclusively spirally. This means in particular that the airbag 34 includes no portion with concertina-like folding.

The combination of the contact surface 32 having an appropriate angle of inclination $\alpha$ and a spiral folding with an appropriate sense of rotation results in an airbag deployment which is, on the one hand, close to the occupant but, on the other hand, not excessively directed against the occupant 20.

After actuation of the airbag module 30 the cover 16 breaks at a tear seam 42 (FIG. 2) so that the airbag 34 can extend out of the cover 16 of the seat back frame side 28. The main deployment direction of the airbag 34 is again indicated by an arrow 36 and extends substantially in parallel to the contact surface 32. Due to the main deployment direction and the spiral folding directed away from the seat back center part 22, a deployment behavior relatively smooth for the occupant 20 is resulting in which a cover portion 44 facing the occupant 20 increasingly adapts to the occupant 20 (FIG. 3).

According to FIG. 2, the airbag module 30 extends substantially in parallel to the contact surface 32 and thus also substantially in parallel to the main deployment direction 36 of the airbag 34 according to FIG. 3. An extension plane of the airbag module 30 is spanned prior to actuation of the airbag module 30 by an inflator axis A of the inflator 40 and a spiral axis B of the spirally folded airbag 34 and after actuation of the airbag module 30 by the inflator axis A and the main deployment direction 36.

The contact surface 32 of the seat back frame 14 for the airbag module 30 is formed to be substantially plane, wherein reinforcing grooves, reinforcing beads or minor edge bendings 46 for stiffening and buckling stabilization of full-surface portions of the seat back frame 14 are negligible.

In a vehicle seat 10 according to FIG. 2 an airbag 34 which is accommodated in a left-hand seat back frame side 28 related to the sitting direction 24 is wound anti-clockwise spirally inwardly viewed from above and an airbag 34 which is accommodated in a right-hand seat back frame side 28 related to the sitting direction 24 is wound clockwise spirally inwardly viewed from above.

In vehicle designs having plural juxtaposed vehicle seats 10 it is furthermore imaginable that an airbag module 30 is provided only in the seat back frame side 28 which is closest to a vehicle side panel 48 when the vehicle seat 10 is installed.

The invention claimed is:

1. A seat back of a vehicle seat (10) having a substantially rigid seat back frame (14) and a cover (16) surrounding the seat back frame (14), comprising
   a full-surface seat back center part (22) extending substantially perpendicularly to the sitting direction (24) in the transverse direction (26) of the seat back,
   two seat back frame sides (28) opposed in the transverse direction (26) of the seat back which laterally delimit the seat back (1) and are transformed into the seat back center part (22),
   an airbag module (30) accommodated in the cover (16) of one of the seat back frame sides (28) and mounted to the seat back frame (14) which airbag module comprises an inflator (40) and a spirally folded airbag (34),
   wherein in the area of the seat back frame side (28) the seat back frame (14) has a contact surface (32) adjacent to the spirally folded airbag (34) and extending substantially obliquely forward away from the seat back center part (22) related to the sitting direction (24) so that the contact surface (32) includes an angle ($\alpha$) of $10°<\alpha<45°$ with the sitting direction (24),
   wherein the airbag (34) extends substantially obliquely forward away from the seat back center part (22) starting from the inflator (40) and related to the sitting direction (24) and is wound spirally inwardly toward the contact surface (32) and away from the seat back center part (22), and
   wherein the spirally wound airbag (34) deploys by unwinding toward the contact surface (32) which directs the unwinding airbag (32) in a main deployment direction (36), the main deployment direction extending parallel to the contact surface (32) and substantially toward a tear seam (42) provided in the cover (16).

2. The seat back according to claim 1, wherein the airbag is spirally folded over the substantial part of its length.

3. The seat back according to claim 2, wherein a maximum of two zigzag folded airbag portions are arranged between the inflator and the spirally wound portion of the airbag.

4. The seat back according to claim 2, wherein at most one zigzag folded airbag portion is arranged at the end of the airbag facing away from the inflator.

5. The seat back according to claim 1, wherein the airbag is spirally folded over its entire length.

6. The seat back according to claim 1, wherein the contact surface (32) includes an angle ($\alpha$) of $15°<\alpha<35°$ with the sitting direction (24).

7. The seat back according to claim 6, wherein the angle ($\alpha$) is approximately 20°.

8. The seat back according to claim 1, wherein the contact surface (32) is plane at least in the area of one or more mounting points.

9. The seat back according to claim 1, wherein the airbag module (30) is arranged on a side of the seat back frame (14) facing the seat back center part (22) in the seat back frame side (28).

10. The seat back according to claim 1, wherein the airbag module (30) extends substantially in parallel to the contact surface (32).

11. A vehicle seat having a seat back (12) according to claim 1.

12. The vehicle seat according to claim 11, wherein the airbag (34) is accommodated in a left-hand seat back frame side (28) related to the sitting direction (24) and is wound anti-clockwise spirally inwardly viewed from above.

13. A vehicle comprising a vehicle seat according to claim 11, wherein an airbag module (30) is provided only in the seat back frame side (28) which is closest to a vehicle side panel (48) when the vehicle seat (10) is installed.

14. The vehicle seat according to claim 11, wherein the airbag (34) is accommodated in a right-hand seat back frame side (28) related to the sitting direction (24) and is wound clockwise spirally inwardly viewed from above.

* * * * *